United States Patent [19]
Nagano

[11] Patent Number: 5,273,495
[45] Date of Patent: Dec. 28, 1993

[54] FRONT GEAR FOR BICYCLE WITH CHAIN RESTORING DEVICE

[75] Inventor: Masashi Nagano, Izumi, Japan

[73] Assignee: Shimano, Inc., Osaka, Japan

[21] Appl. No.: 876,305

[22] Filed: Apr. 30, 1992

[30] Foreign Application Priority Data

May 13, 1991 [JP] Japan ................. 3-107024

[51] Int. Cl.⁵ ............................................. F16H 55/30
[52] U.S. Cl. ..................... 474/144; 474/160; 474/273; 74/609
[58] Field of Search ............. 474/56, 80, 49, 140, 474/144, 160, 273, 151; 74/594.2, 609, DIG. 10

[56] References Cited

U.S. PATENT DOCUMENTS

| | | | |
|---|---|---|---|
| 4,111,063 | 9/1978 | Journey | 74/242.6 |
| 4,198,876 | 4/1980 | Nagano | 74/243 R |
| 4,384,865 | 5/1983 | Ueno | 474/160 |
| 4,439,172 | 3/1984 | Segawa | 74/594.2 X |
| 4,580,997 | 4/1986 | Browning et al. | 474/80 X |
| 4,598,608 | 7/1986 | Ueno | 74/594.2 |
| 4,960,402 | 10/1990 | Klein et al. | 474/80 |
| 5,002,520 | 3/1991 | Greenlaw | 474/144 X |

FOREIGN PATENT DOCUMENTS 59-34553 9/1984 Japan.
2-24398 4/1990 Japan.

*Primary Examiner*—Ramon S. Britts
*Assistant Examiner*—Roger J. Schoeppel
*Attorney, Agent, or Firm*—Dickstein, Shapiro & Morin

[57] ABSTRACT

A multistage front gear apparatus for a bicycle having a device for restoring a chain having fallen off which includes a shelf portion (51) extending axially of the rotary shaft, a chain engaging portion (52) extending from a free end region of the shelf portion radially outwardly of the rotary shaft, and a guide portion (53) disposed peripherally of the shelf portion for guiding the chain away from the chain engaging portion. The chain engaging portion (52) has opposite edges in a rotating direction extending substantially at right angles to the shelf portion. The guide portion (53) is formed on peripheral side surfaces of the shelf portion, and includes inclined guide surfaces extending from positions of connection to the chainwheel to peripheral regions of the shelf portion.

6 Claims, 6 Drawing Sheets

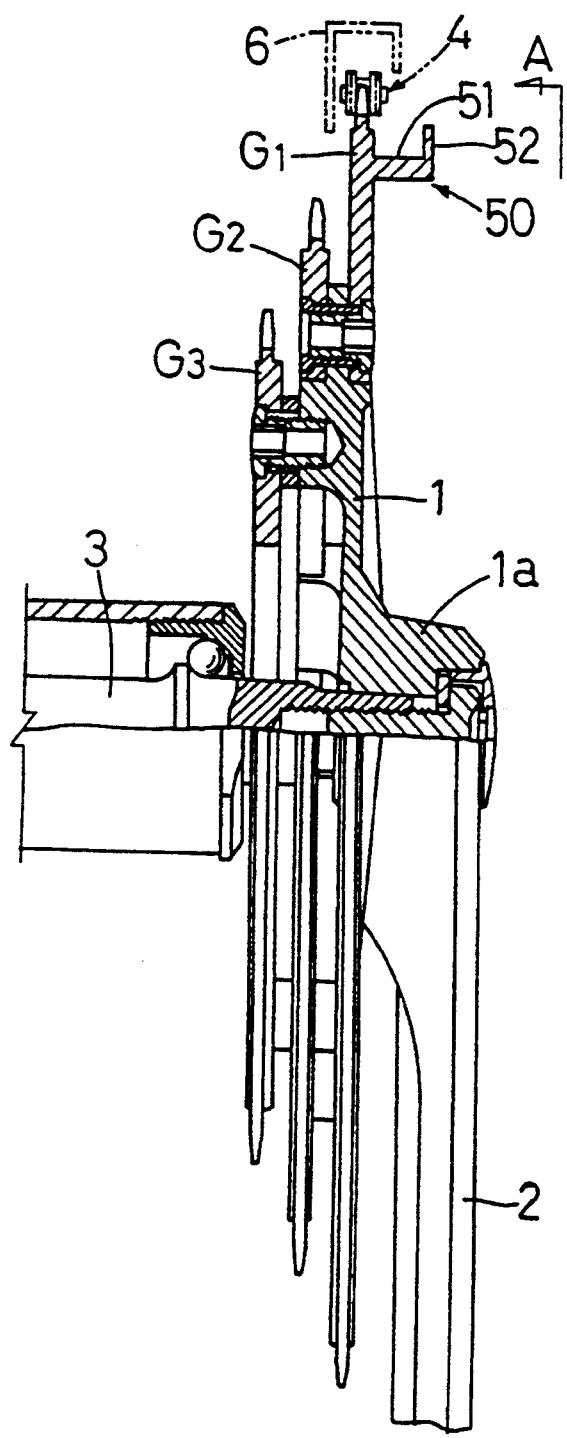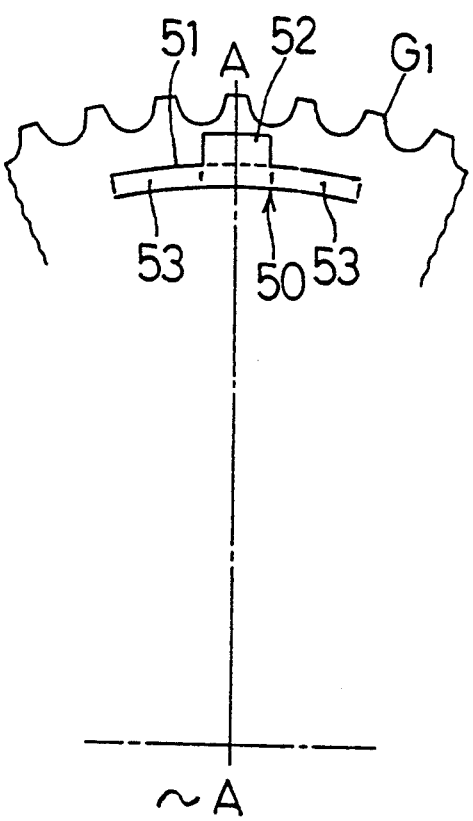

FRONT GEAR FOR BICYCLE WITH CHAIN RESTORING DEVICE

BACKGROUND OF THE INVENTION

1. Field of the Invention

The present invention relates to a front gear apparatus for a bicycle having a chain restoring device.

2. Description of the Related Art

FIGS. 7a through 7e show a known example of front gear apparatus. This apparatus includes a front gear or chainwheel G1 having a chain restoring device 150 so that a chain 4 having fallen off the chainwheel G1 may be restored on the chainwheel G1 by rotating the chainwheel G1 and operating a front derailleur 6. Specifically, as shown in FIG. 7b, the restoring device 150 includes a chain receiving portion 151 extending axially of the chainwheel G1, and a chain engaging portion 152 extending from the chain receiving portion 151 radially outwardly of the chainwheel G1. When the chain 4 falls off the chainwheel G1, the restoring device 150, in its movement from inside the loop of the chain 4 to outside as the chainwheel G1 rotates, catches an upper run 4b of the chain 4 at the position shown in a solid line in FIG. 7a and raises the upper run 4b of the chain 4 to the position shown in a dotted line. As the upper run 5b is raised to the level of the front derailleur 6, the cyclist operates the derailleur 6 to cause the chain 4 to cross the chainwheel G1. This crossing and rotation of the chainwheel G1 put the chain 4 back on the chainwheel G1 again.

In the prior art noted above, the chain falling from the chainwheel to the restoring device would sometimes fall off the restoring device as a result of vibrations or the like. The chain tends to fall off the restoring device more easily where the chain engaging portion is designed to extend a reduced length from the chain receiving portion for compactness and lightness of the chain restoring device.

Further, as shown in a dotted line in FIG. 7c, if the restoring device 150 is outside the loop of the chain 4 when the chain 4 falls off the chainwheel G1, the restoring device 150 may move into contact with an outside position of the lower run 4a of the chain lying below a crank axle 3. As shown in FIG. 7d, the restoring device 150 has a shape difficult to slip past the lower run 4a of the chain. As the restoring device 150 moves upward after contacting the lower run 4a of the chain, the chain engaging portion 152 begins to act on the lower run 4a of the chain as shown in FIG. 7e. Consequently, the lower run 4a is not easily separable from the restoring device 150 and, as shown in a solid line in FIG. 7c, the lower run 4a becomes caught by the restoring device 150, thereby rendering the chainwheel G1 no longer rotatable.

SUMMARY OF THE INVENTION

The object of the present invention is to provide a multistage front gear apparatus for a bicycle having a chain restoring device which, even when lying outside the loop of the chain having fallen off the chainwheel, is capable of reliably restoring the chain on the chainwheel without giving rise to the problems noted above.

The above object is fulfilled, according to the present invention, by a multistage front gear apparatus for a bicycle comprising:
a rotary shaft;
a plurality of chainwheels having different outside diameters and connected to the rotary shaft; and
chain restoring means rotatable with at least one of the chainwheels for restoring a chain having fallen off this chainwheel, the chain restoring means including:
a shelf portion extending axially of the rotary shaft;
a chain engaging portion extending from a free end region of the shelf portion radially outwardly of the rotary shaft; and
a guide portion disposed peripherally of the shelf portion for guiding the chain away from the chain engaging portion.

The gist of the present invention lies in the provision of the shelf portion, chain engaging portion and guide portion. This is based on the perception that an upper run of the chain having fallen off a chainwheel lies above the crank axle and extends substantially horizontally, whereas a lower run of this chain lies below the crank axle and extends in a sloping way due to gravity to become lower rearwardly away from the crank axle.

To explain the gist of the invention, reference is now made to the drawings which are to be used in describing the embodiment to follow.

In FIGS. 4a and 5a an upper run 4b of the chain 4 having fallen off extends substantially horizontally as noted above, whereas a lower run 4a slopes down at a large angle of inclination. The invention utilizes this difference in posture between the upper run 4b and lower run 4a of the chain. When a restoring device 50 crosses a line along which the lower run 4a extends, the chain engaging portion 52 reaches that line after the lower run 4a has moved laterally outwardly of the shelf portion 51 by action of the guide portion 53 as shown in FIGS. 4b through 4g. The guide portion 53 and chain engaging portion 52 are shaped such that the chain engaging portion 52 slips past a side of the lower run 4a of the chain opposed to a side surface of the chainwheel. Subsequently, the restoring device 50 crosses a line along which the upper run 4b of the chain extends. The shapes of the guide portion 53 and chain engaging portion 52 are such that, as shown in FIGS. 5b through 5d, an extreme end of the chain engaging portion 52 reaches that line and catches the upper run 4b of the chain before the upper run 4b moves completely to a position laterally outwardly of the shelf portion 51 by the action of the guide portion 53. That is, when the restoring device 50 crosses the line of the lower run 4a from outside the loop of the chain 4 having fallen off, the restoring device 50 moves along a locus forming a large angle with the lower run 4a of the chain. Consequently, the guide portion 53 allows the restoring device 50 to slip past the side of the lower run 4a of the chain opposed to the chainwheel and into the loop of the chain 4 without catching the lower run 4a. When the restoring device 50 crosses the line of the upper run 4b from inside the loop of the chain 4 having fallen off, the locus of movement of the restoring device 50 forms a small angle with the upper run 4b of the chain. Consequently, the chain engaging portion 52 catches the upper run 4b of the chain despite the action of the guide portion 53. The upper run 4b of the chain thus caught is raised to a position level with a front derailleur 6 as shown in a dotted line in FIG. 5a. The derailleur 6 is then operated, which in combination with rotation of the chainwheel G1 restores the upper run 4b of the chain on the chainwheel G1.

As described above, when the restoring device lies outside the loop of the chain having fallen off, the inclined chainwheel allows the restoring device to slip past the lower run of the chain without catching the lower run. The restoring device thereafter catches and raises the upper run of the chain. Under any circumstances, the chain having fallen off may be restored with ease simply by rotating the chainwheel and operating the front derailleur.

Other features and advantages of the present invention will be apparent from the following description of the preferred embodiment.

BRIEF DESCRIPTION OF THE DRAWINGS

FIG. 2 is a sectional view of the front gear apparatus, FIGS. 4a through 4g are side views showing a way in which the restoring device slips past a lower run of a chain.

DETAILED DESCRIPTION OF THE PREFERRED EMBODIMENT

Figure 1:
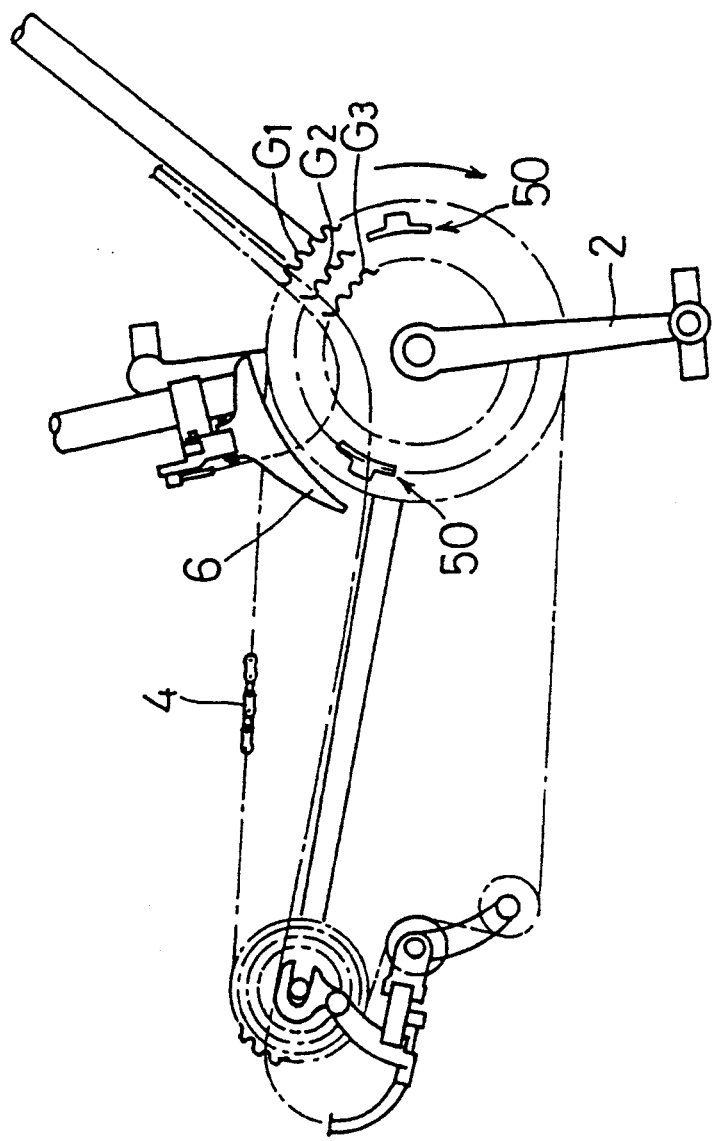
FIG. 1 is a schematic side view of a front gear apparatus according to the present invention.

Referring to FIGS. 1 and 2, a front gear apparatus for a bicycle includes three front gears or chainwheels G1, G2 and G3 having different outside diameters. These chainwheels G1, G2 and G3 are supported by a single support 1 coaxially and rotatable in unison. The support 1 has a crank arm 2 for rotating the support 1 in unison with a crank axle 3 through a boss 1a. Thus, the chainwheels G1, G2 and G3 are rotatable with the support 1 by turning the crank arm 2.

The outermost and largest chainwheel G1 has restoring devices 50 secured to two positions on an outer side surface thereof for acting on a chain 4 having fallen off the chainwheel G1. These restoring devices 50 put the chain 4 having fallen off the chainwheel G1 back on the chainwheel G1 only by rotation of the chainwheel G1 and operation of a front derailleur 6.

Figure 3:
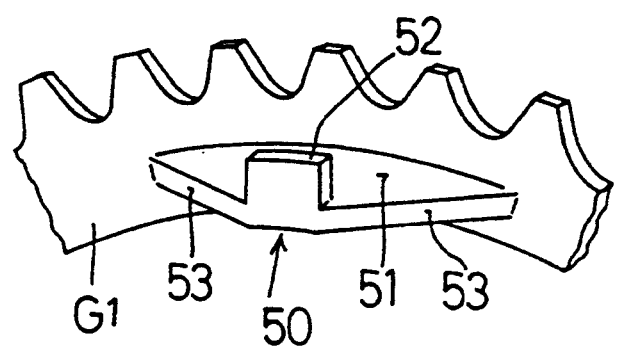
FIG. 3 is a perspective view of a restoring device.

As shown in FIGS. 2 and 3, each of the restoring devices 50 includes a shelf portion 51 extending from the outer surface of the chainwheel G1 axially of the chainwheel G1, and a chain engaging portion 52 extending from a free end region of the shelf portion 51 radially outwardly of the chainwheel G1. A chain receiving space is defined by the shelf portion 51, chain engaging portion 52, and the side surface of the chainwheel G1. As seen from a view taken in the direction of arrow A in FIG. 2, the shelf portion 51 extends from the side surface of the chainwheel G1 at right angles to a radial direction thereof, and edges of the chain engaging portion 52 opposite in a rotating direction extend substantially at right angles to the shelf portion 51. A guide 53 for acting on the chain 4 having fallen off is formed on end surfaces of the shelf portion 51. As seen from FIGS. 2 and 3, the guide 53 includes a surface extending parallel to the side surface of the chainwheel G1, and inclined surfaces extending from opposite ends of that surface to the side surface of the chainwheel G1.

Figure 4A:
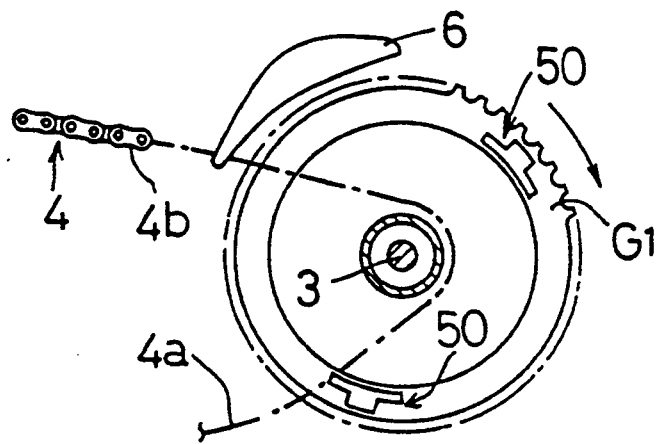
Figure 4B:
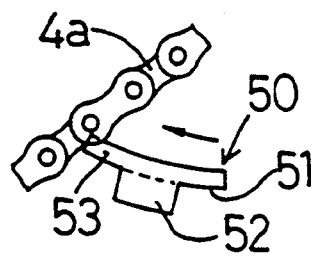
Figure 4B:
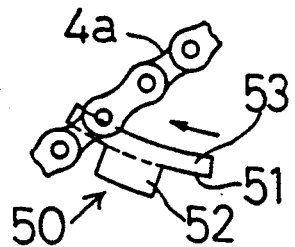
Figure 4F:
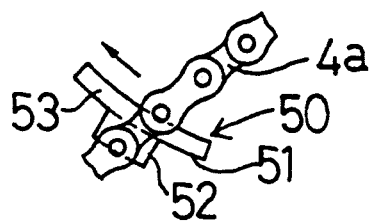
Figure 4C:
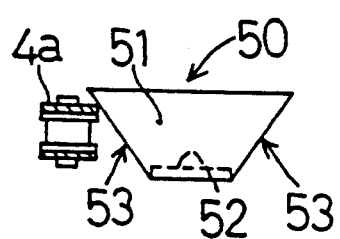
Figure 4E:
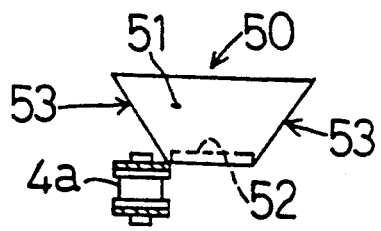
Figure 4G:
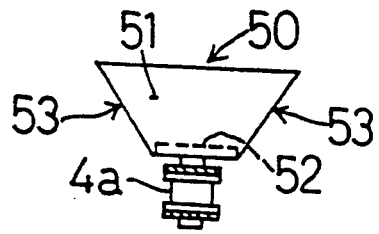
Figure 5A:
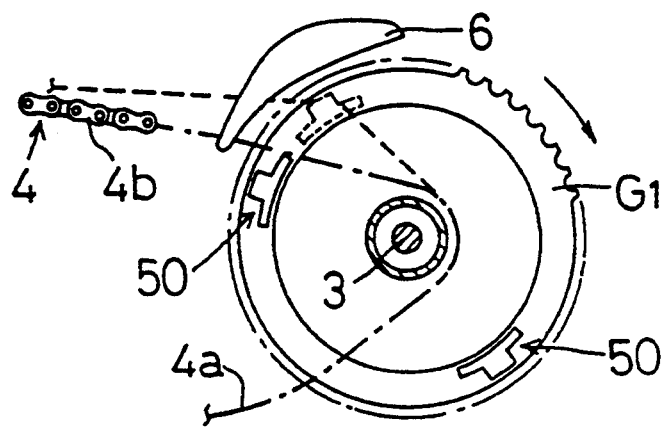
FIGS. 5a through 5d are side views showing a way in which the restoring device picks up an upper run of the chain.
Figure 5B:
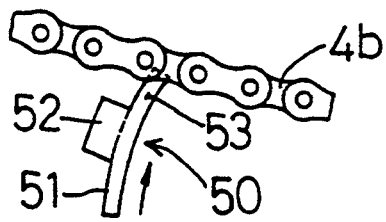
Figure 5C:
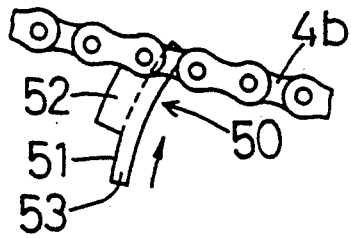
Figure 5D:
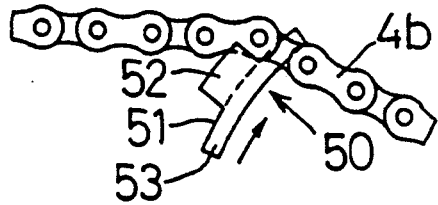
Figure 7A:
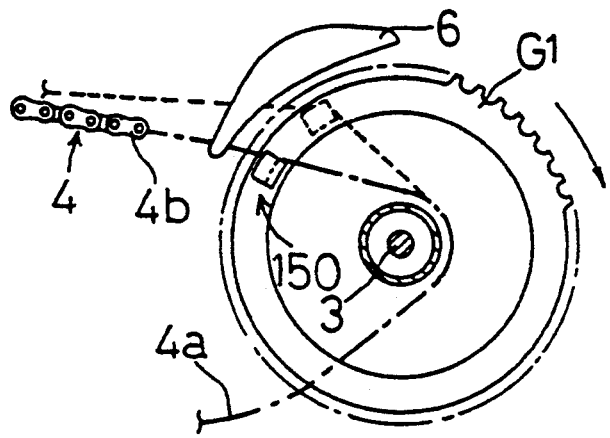
FIGS. 7a through 7e are schematic views showing a conventional front gear apparatus.
Figure 7B:
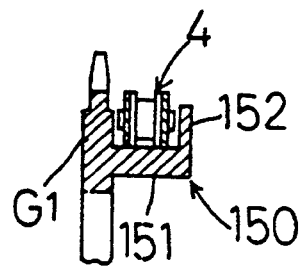
Figure 7C:
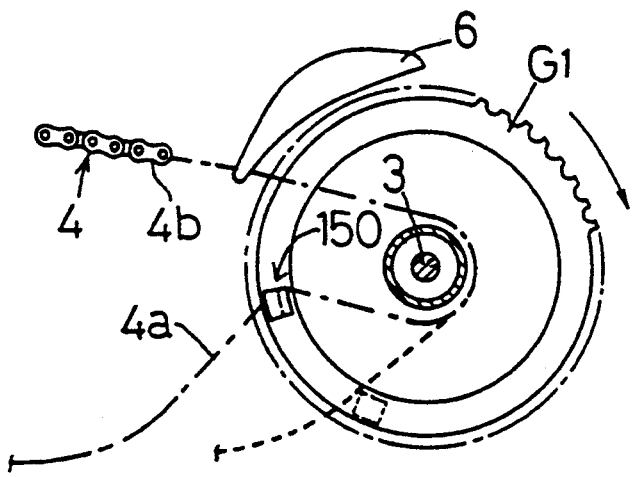
Figure 7D:
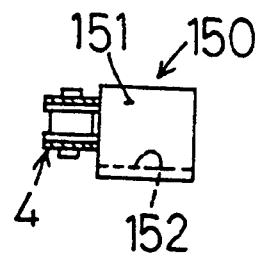
Figure 7E:
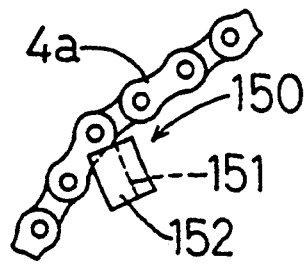

As shown in FIG. 4a, one of the restoring devices 50 lying outside the loop of the chain 4 having fallen off the chainwheel G1 moves, with rotation of the chainwheel G1, into contact with a lower run 4a of the chain below the crank axle 3. At this time, as shown in FIGS. 4b and 4c, one of the inclined surfaces of the guide 53 precedes the chain engaging portion 52 and begins to act on the lower run 4a of the chain. With further rotation of the chainwheel G1, the guide 53 pushes the lower run 4a of the chain away from the chainwheel G1 with the aid of the inclined surface as shown in FIGS. 4d and 4e. After the lower run 4a of the chain has moved to a position outside the shelf portion 51, the chain engaging portion 52 reaches a line along which the lower run 4a extends. Consequently, as shown in FIGS. 4f and 4g, the chain engaging portion 52 slips past an inside surface of the lower run 4a and enters the loop of the chain 4. With further rotation of the chainwheel G1, as shown in FIG. 5a, the restoring device 50 inside the loop of the chain 4 reaches an upper run 4b of the chain 4 lying above the crank axle 3. It should be noted here that the upper run 4b of the chain extends substantially horizontally as distinct from the lower run 4a which, as shown in FIG. 4a, extends in a sloping way. As the inclined guide 53 pushes the upper run 4b of the chain, as shown in FIGS. 5b through 5d, an edge of the chain engaging portion 52 contacts, catches and raises the upper run 4b before the upper run 4b is pushed laterally outwardly of the shelf portion 51. When the upper run 4b of the chain is raised to a position level with the front derailleur 6 as shown in a dotted line in FIG. 5a, the derailleur 6 is operated to displace the upper run 4b sideways, whereby the upper run 4b crosses the chainwheel G1 in plan view. As a result of this crossing and rotation of the chainwheel G1, the upper run 4b of the chain is restored on the chainwheel G1.

Figure 6:
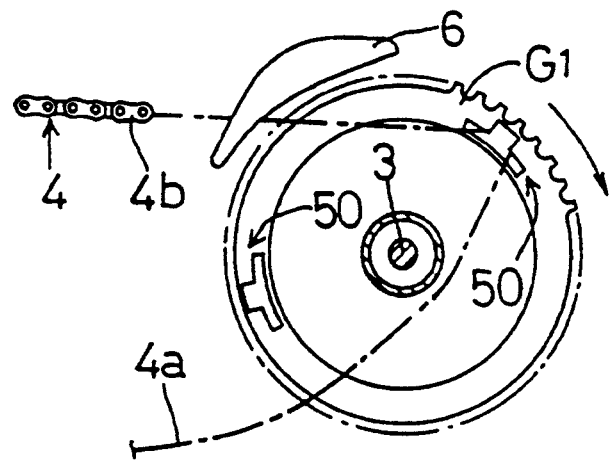
FIG. 6 is a side view showing the restoring device engaging the chain.

It is possible that one of the restoring devices 50 lies inside the loop of the chain 4 having fallen off the chainwheel G1 as shown in FIG. 6. In this case, of course, the restoring device 50 acts on the upper run 4b of the chain as the restoring device 50 crosses a line along which the upper run 4b extends. Then the restoring device 50 raises the upper run 4b and, with operation of the front derailleur 6, restores the upper run 4b on the chainwheel G1.

The foregoing embodiment may be modified in varied ways within the scope of the present invention. For example, the innermost chainwheel G3 may also have restoring devices 50 secured to an inside surface thereof for restoring the chain when the chain falls off inwardly of the bicycle. One or three or more restoring devices 50 may be provided instead of two. The inclined guide 53, instead of being formed as part of each restoring device 50, may be attached to the chainwheel G1 separately from the restoring device 50 to be movable with the chainwheel G1 and restoring device 50.

What is claimed is:

1. A multistage front gear apparatus for a bicycle comprising:
   a rotary shaft;
   a plurality of chainwheels having different outside diameters and connected to said rotary shaft; and
   chain restoring means rotatable with at least one of said chainwheels for restoring a chain which has fallen off said one of said chainwheels, said chain restoring means including:
   a shelf portion extending axially of said rotary shaft;

a chain engaging portion extending from a free end region of said shelf portion radially outwardly of said rotary shaft; and a guide portion disposed peripherally of said shelf portion for guiding said chain away from said chain engaging portion, and wherein said guide portion includes inclined guide surfaces extending from positions of connection of said chain restoring means to said one of said chainwheels to peripheral regions of said shelf portion.

2. A multistage front gear apparatus as claimed in claim 1, wherein said shelf portion extends from a side surface of said one of said chainwheels at right angles to a radial direction of said chainwheels, said chain engaging portion having opposite edges in a rotating direction extending substantially at right angles to said shelf portion.

3. A multistage front gear apparatus as claimed in claim 2, wherein said guide portion is formed on peripheral side surfaces of said shelf portion, said inclined guide surfaces being linear.

4. A multistage front gear apparatus as claimed in claim 3, wherein said chain restoring means has a chain receiving portion formed between an inner side surface of said chain engaging portion and said side surface of said one of said chainwheels and having a space substantially corresponding to a width of said chain.

5. A multistage front gear apparatus as claimed in claim 4, wherein said chain restoring means is provided at two positions on an outer side surface of a largest one of said chainwheels.

6. A multistage front gear apparatus as claimed in claim 1, wherein said chain engaging portion is substantially perpendicular to said shelf portion.

* * * * *